No. 634,951. Patented Oct. 17, 1899.
H. MONROE.
END GATE FOR WAGONS.
(Application filed Aug. 21, 1899.)
(No Model.) 2 Sheets—Sheet 1.
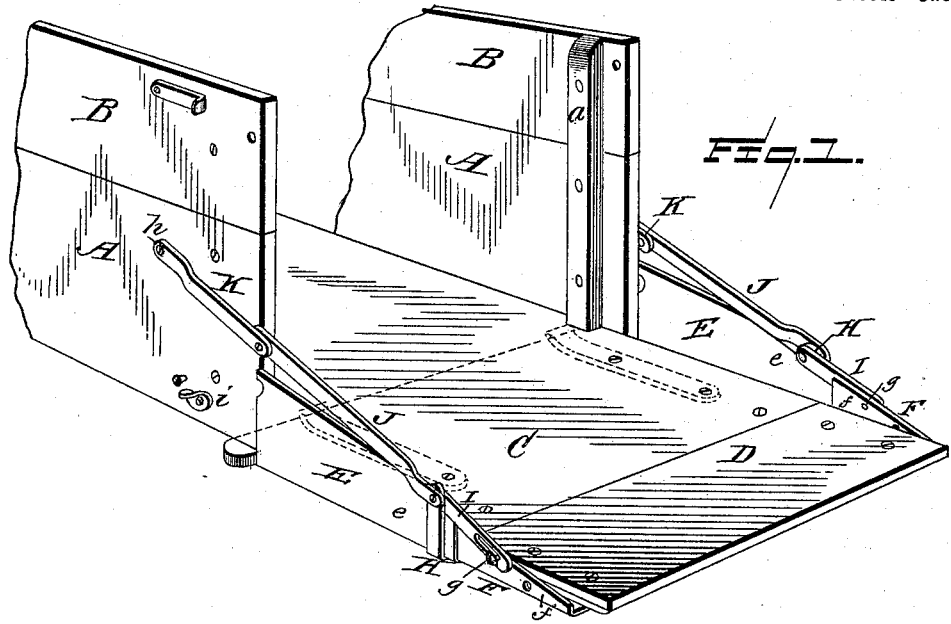
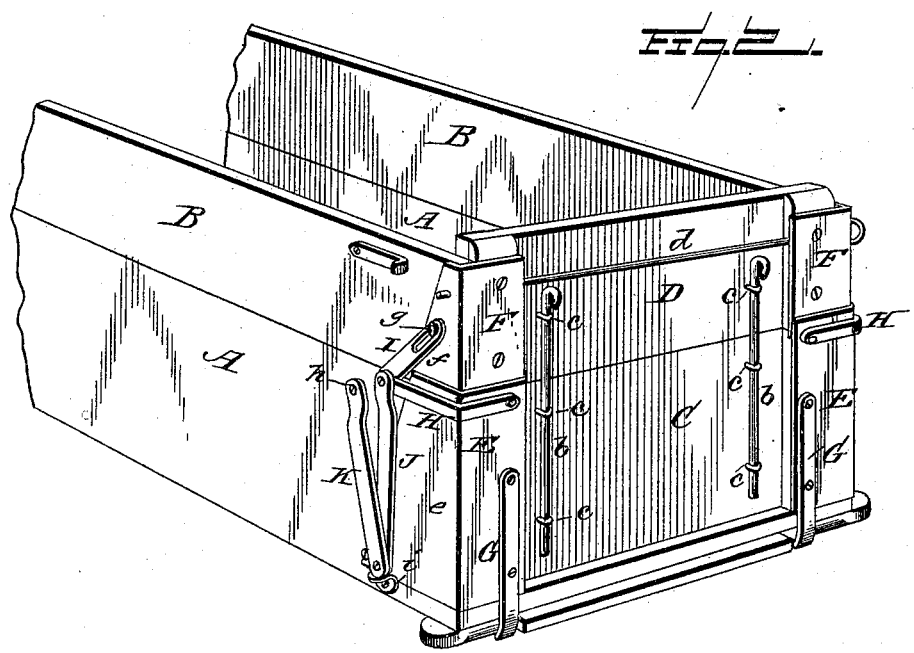
Witnesses
L. C. Hills
Wm. F. Doyle
Inventor
Henry Monroe.
By Chas. H. Fowler,
Attorney No. 634,951. Patented Oct. 17, 1899.
H. MONROE.
END GATE FOR WAGONS.
(Application filed Aug. 21, 1899.)
(No Model.) 2 Sheets—Sheet 2.
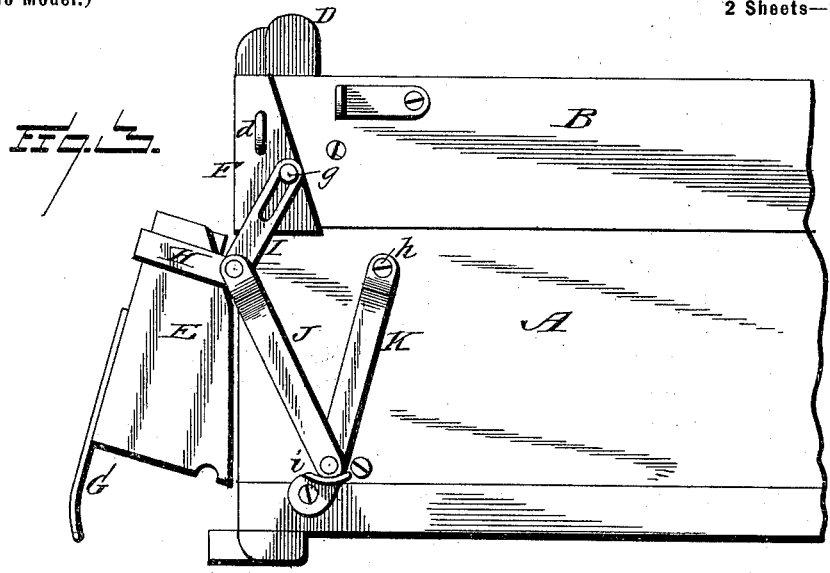
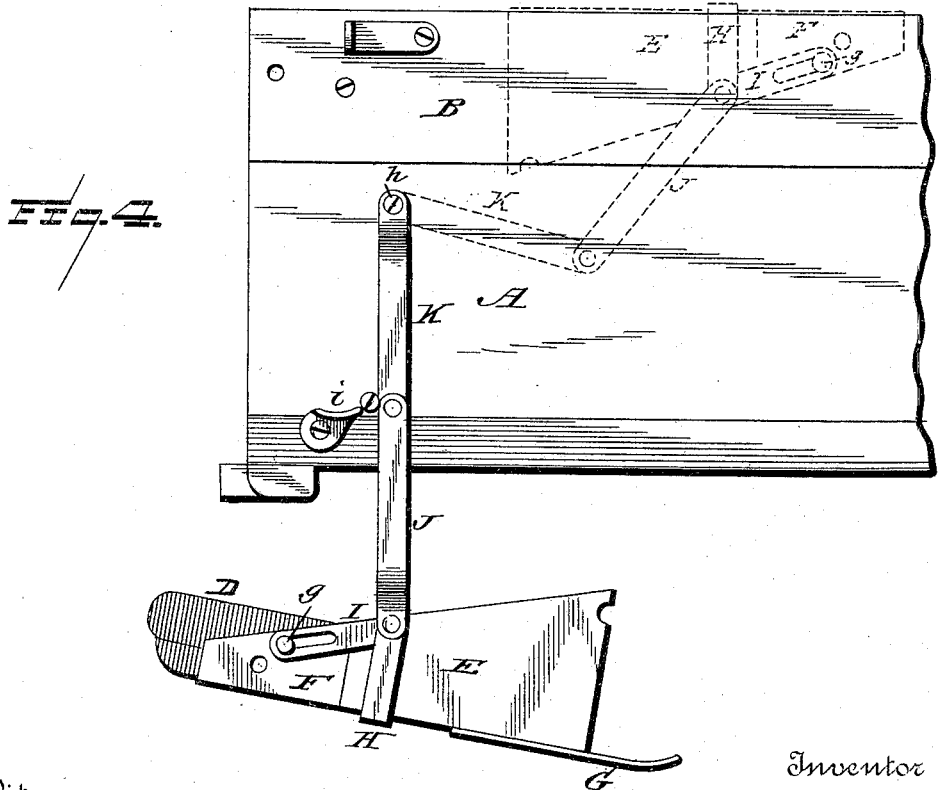
Witnesses
L. O. Hills
Wm. F. Doyle
Inventor
Henry Monroe,
By Chas. H. Fowler
Attorney

UNITED STATES PATENT OFFICE.

HENRY MONROE, OF ABINGDON, ILLINOIS.

END-GATE FOR WAGONS.

SPECIFICATION forming part of Letters Patent No. 634,951, dated October 17, 1899.

Application filed August 21, 1899. Serial No. 727,954. (No model.)

*To all whom it may concern:*

Be it known that I, HENRY MONROE, a citizen of the United States, residing at Abingdon, in the county of Knox and State of Illinois, have invented certain new and useful Improvements in End-Gates for Wagons; and I do hereby declare that the following is a full, clear, and exact description of the same, reference being had to the annexed drawings, making a part of this specification, and to the letters of reference marked thereon.

The present invention has for its object to provide a simple and effective end-gate for wagon-boxes that can be brought into position whereby corn or grain may be discharged from the end of the box at the bottom thereof and also used as a scoop-board when found necessary or swung over the top of the box or under the same, as circumstances require.
The invention consists of an end-gate constructed substantially as shown in the drawings and hereinafter described and claimed.

Figure 1 of the drawings is a perspective view of the rear end of a wagon-box, showing the end-gate let down to be used as a scoop-board; Fig. 2, a similar view showing the end-gate in a closed position; Fig. 3, a side elevation showing the lower section of the end-gate in a position to admit the discharge of grain or corn from the bottom of the wagon-box; Fig. 4, a similar view showing the end-gate swung in position under the wagon-box in full lines and over the top thereof in dotted lines.

In the accompanying drawings, A represents the wagon-box provided with the usual side-boards B, which are also used at the ends of the box to increase its holding capacity.

To the rear end of the wagon-box is connected the end-gate, which consists of the two sections C D, as shown in Figs. 1 and 2 of the drawings. These sections when in an upright position to close the end of the wagon-box rest against the cleats $a$ upon the inner side of the box. The two sections C D are held together by the vertical rods $b$, which engage with suitable staples $c$ and are removable when it is desired to separate the two sections of the end-gate and bring the lower section C in position (shown in Fig. 3 of the drawings) for the purpose of discharging small grain. In such position the upper section is held in place by means of the horizontal rod $d$ to close the upper portion of the wagon-box at its rear end. The two end-gate sections C D have connected thereto angle brace-plates E F, respectively, which plates are secured to the outer side of the sections.

When the gate is in a closed position, as shown in Fig. 2 of the drawings, the side wings $e f$ of the plates E F embrace the sides of the wagon-box, forming a perfect joint between the end-gate and the sides of the box. The angle brace-plates E are provided with supporting-arms G, which extend under the wagon-box to sustain the lower section C of the end-gate in a horizontal position, as shown in Fig. 1 of the drawings. The outer or upper end of the angle brace-plates E are provided with angle-bars H, which bars are bent at right angles to extend across both wings of the plates and form a strengthening-brace therefor. The ends of the arms H project slightly beyond the wings $e$ of the plates E, and pivoted thereto are slotted straps I, the slotted ends thereof engaging with pins $g$ upon the plates F. To the angle-bars H are also pivoted the straps J, and to said straps are pivoted one end of the straps K, which straps in turn are pivoted to the sides of the wagon-box, as shown at $h$. A supporting-bracket $i$ is secured to the sides of the wagon-box and sustain the straps J K when the gate is closed, as shown in Fig. 2 of the drawings, or when the lower section is thrown out in the position shown in Fig. 3, in which latter case the gate-section E is held in its suspended position for the purpose of unloading small grain.

It will be seen that the slotted straps I and the straps pivoted together and to the slotted straps and sides of the wagon-box, respectively, form together a perfect connection between the end-gate and the wagon-box and admit of the gate being adjusted or thrown under the wagon-box, as shown in full lines of Fig. 4 of the drawings, or brought over on top of the box, as shown in dotted lines, to serve as a seat.

The two gate-sections E F may be operated together and brought to the position shown in Fig. 1 of the drawings, or by withdrawing the rods $b$ the two sections may be operated independently of each other, as circumstances require, thereby providing a simple and practically-operating gate that may be applied to the rear end of any wagon-box with comparatively little trouble.

The end-gate will possess strength and durability and can be used with heavy wagons or light wagons either for farmwork or for use in general hauling.

Having now fully described my invention, what I claim as new, and desire to secure by Letters Patent, is—

1. An end-gate for wagon-boxes, said gate comprising two sections connected together by suitable pivoted straps whereby the sections may be operated independently of each other, a removable rod to secure the upper gate-section to the box when the lower section is to be operated independently, removable rods for securing the two sections together, and supporting-arms connected to the lower section for retaining the gate in a horizontal position, substantially as and for the purpose set forth.

2. An end-gate for wagon-boxes, consisting of two gate-sections provided with means for connecting them together or disconnecting them to enable the sections to be used together or separately, angle brace-plates connected to the gate-sections, supporting-arms upon the lower section, angle-bars connected to the brace-plates on said section, slotted straps pivoted to the brace-plates of the upper section and to the angle-bars, and straps pivoted together and to the angle-bars and to the sides of the wagon-box, substantially as and for the purpose specified.

In testimony that I claim the above I have hereunto subscribed my name in the presence of two witnesses.

HENRY MONROE.

Witnesses:
R. E. HELLER,
F. M. TRIBBETT.